Oct. 19, 1965 F. J. PRINCE 3,212,706
APPARATUS FOR INDICATING THE DISTRIBUTION
OF RADIANT ENERGY AND THE LIKE
Filed May 17, 1963 5 Sheets-Sheet 2

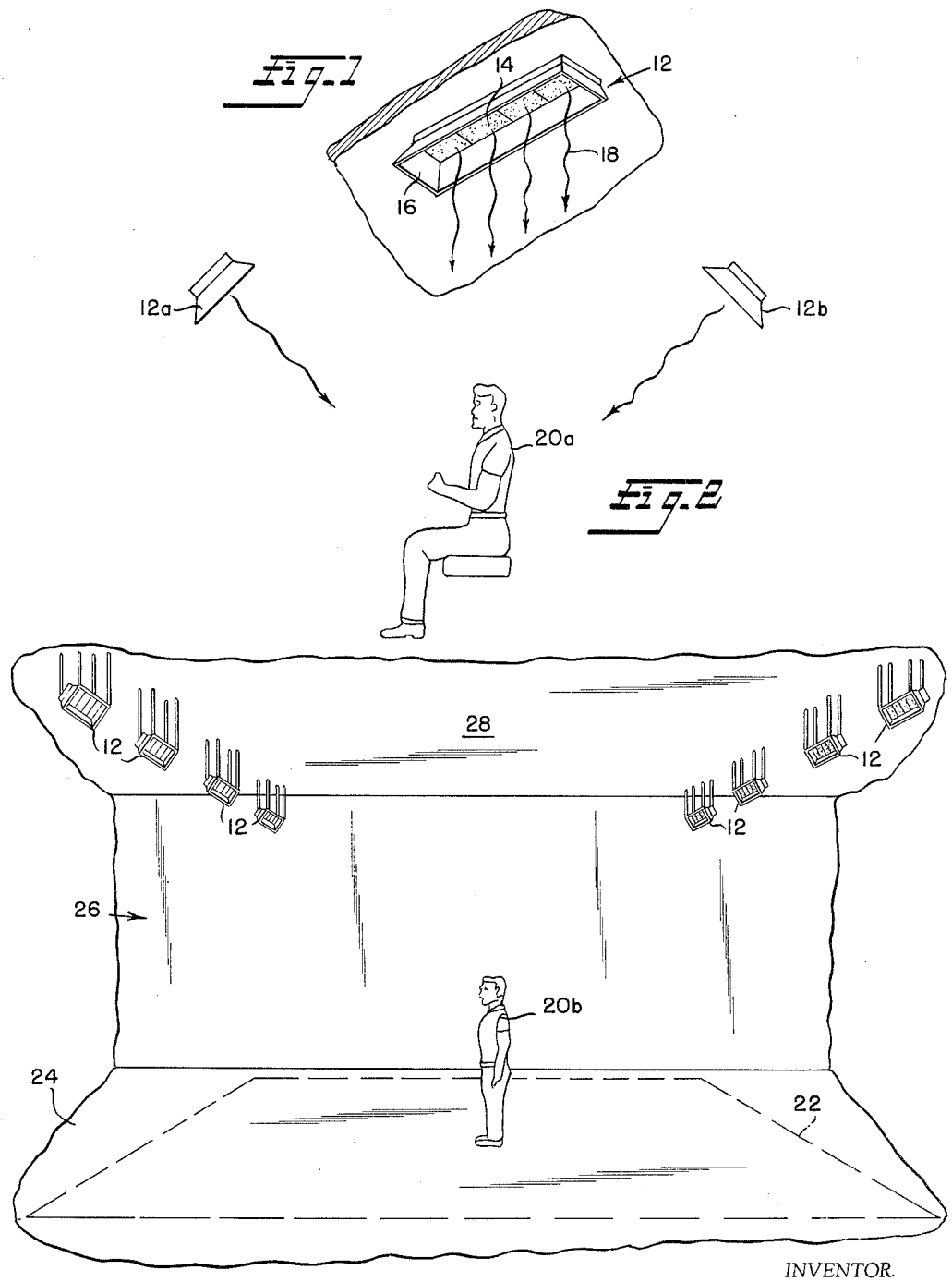

INVENTOR.
Fred J. Prince
BY
Strauch, Nolan & Neale
Attorneys

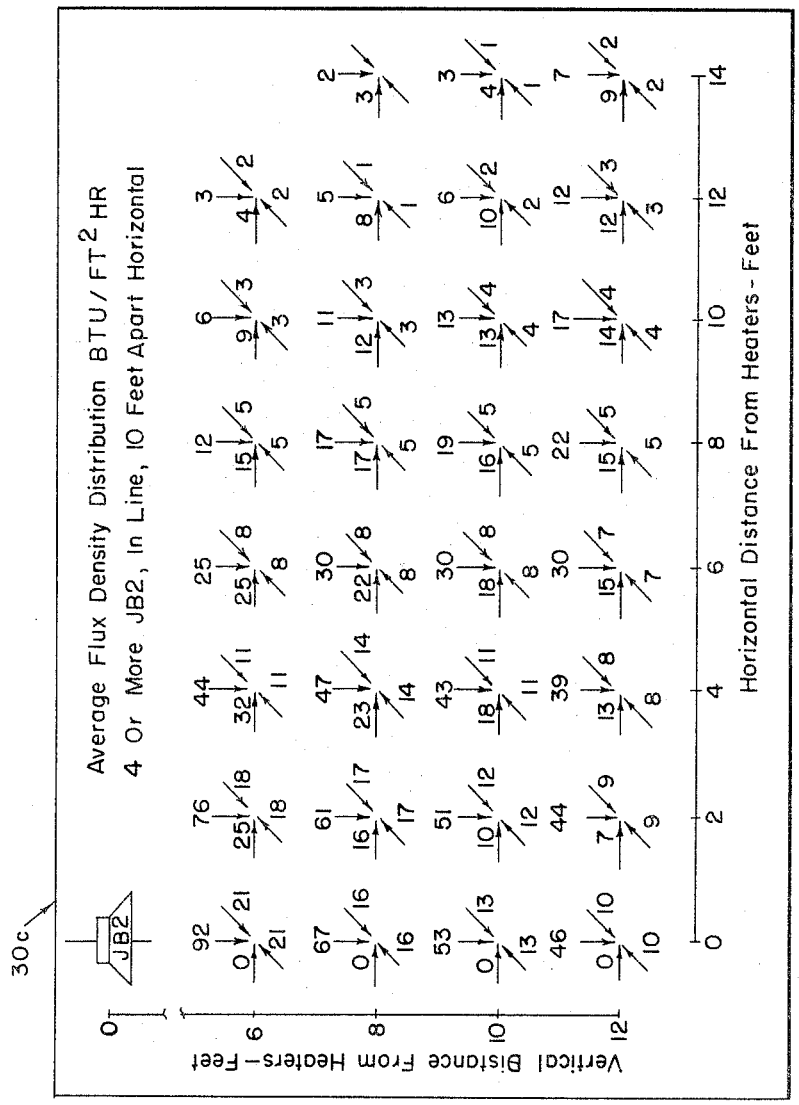

United States Patent Office 3,212,706
Patented Oct. 19, 1965

3,212,706
APPARATUS FOR INDICATING THE DISTRIBUTION OF RADIANT ENERGY AND THE LIKE
Fred J. Prince, Euclid, Ohio, assignor to Hupp Corporation, Cleveland, Ohio, a corporation of Virginia
Filed May 17, 1963, Ser. No. 281,294
11 Claims. (Cl. 235—89)

This invention relates to methods and apparatus for selecting, locating, and orienting radiant heaters to provide comfortable thermal conditions for individuals situated in a limited area in which at least part of the heat is supplied to their bodies by radiation from said heaters. More specifically, this invention relates to the selection, location and orientation of radiant heaters for use as spot or area heaters in places where the ambient temperature is not high enough to provide comfortable thermal conditions in the absence of an additional heat source.

Heaters distributing heat in the form of infrared radiation have come into quite general use, particularly for heating persons or objects in large buildings, open structures or even outdoors when it is impractical to maintain a comfortable air temperature, or where comfortable conditions are needed in only part of the total space. In the past, it has been extremely difficult to determine in advance the proper number and size of such heaters required and the most effective arrangement of the heaters for particular installations. In some cases more heating capacity has been installed than required, resulting in an excessive cost for the equipment. In other cases, the installation of too little capacity has left the users dissatisfied. In still other instances, heaters have been incorrectly placed, resulting in wasted fuel and/or underheating some parts of the space while overheating other parts. In other installations, the heaters have been placed too close to the occupants or located directly overhead and parts of the occupants body, particularly the head, feel uncomfortably hot while other parts such as the feet are cold. The heaters were located too high in other instances and radiation was wasted by scattering over areas where no heat was required.

In short, until the present invention, the growth of the industry has been seriously retarded by lack of a simple method by which the contractor or heating engineer can determine the most suitable capacity and placement of the radiant heaters in a given situation.

It is therefore one object of the present invention to provide novel methods and apparatus for quickly and easily determining suitable sizes, numbers, locations, and orientations of radiant heaters for given installations.

The amount of heat which must be delivered by radiation from the heaters in the area to be heated for human comfort must offset the body heat which would otherwise be lost (in excess of such heat loss as is required to maintain a comfortable body temperature). These losses are affected by:

(a) Heat produced by body metabolism, largely governed by the activity of the individual;
(b) The insulating effect of the clothing worn;
(c) The velocity of the air past the individual;
(d) The surface temperature of the surroundings; and
(e) The ambient air temperature.

To determine body heat loss under specified conditions, tables have been prepared of average losses due to: (1) radiation to surroundings; (2) convection from body surfaces; and (3) evaporation due to perspiration for persons engaging in various activities and attired in various types of clothing. Such tables have been prepared for air of various temperatures and moving at different rates in surroundings at specified temperatures. By use of these tables (or by other methods) the contractor or heating engineer can estimate the heat loss per square foot of body surface of typical individuals in different areas to be heated when no heat is being supplied by the infrared units.

This invention provides a simple means for ascertaining if a given heater or group of heaters placed in a given relation to the individual will supply sufficient radiant heat to offset this estimated heat loss without overheating the individual or portions of his body such as his head, for example.

It is, therefore, another object of this invention to provide novel methods and apparatus for determining the rate of heat transmission to the body of an individual placed in a given relation to a specified radiant heater or heaters.

In general, the present invention includes: (a) a transparency on which one or more outlines of a person in seated, standing, or other positions have been drawn; and (b) a chart showing flux density in B.t.u. per square foot per hour impinging on surfaces located at various points with relation to a particular heater or group of heaters in a given orientation. By moving the transparency over the charts and comparing the flux densities shown at various points with the calculated heat supply requirement in accordance with my present invention, the heaters, the orientations thereof, the height above the floor at which they should be located, and the horizontal distance from the heaters to the subject at which the required flux density are readily determined.

Several suitable heaters and arrangements may be found rapidly by utilization of my invention and a final selection made among them based on other considerations, such for example as the cost of the installed heating system, its operating cost, its suitability for the building structure, and the appearance of the installation.

It is, therefore, another object of the present invention to provide novel methods and apparatus for rapidly selecting radiant heaters and heater orientations capable of providing radiant energy of a precalculated flux density at a location removed from the heater or heaters.

The charts may be further employed in conjunction with the transparencies to determine whether the flux density striking the head of a person being warmed by infrared radiation from an overhead radiant heater is excessive in comparison with the average flux density on his body, as would be the case if the heater were located too close directly overhead. In this manner uncomfortable differential heating effects can readily be avoided.

A further object of this invention is, accordingly, to provide novel methods and apparatus for determining the flux density distribution of radiation on different parts of the body of a person situated in a specific position with respect to the source of the radiation.

Other objects and further novel features of the present invention will become more fully apparent from the appended claims and as the following detailed description proceeds in reference to the accompanying drawings, wherein:

FIGURE 1 is a perspective view of an infrared radiant heater which can be used for spot heating and which can be selected and installed in accordance with the method of the present invention;

FIGURE 2 is an elevation showing two heaters of the type depicted in FIGURE 1 placed for heating a person remaining in a small area, the capacity and placement of the heaters being determined by the method of the present invention;

FIGURE 3 is a perspective view of an installation of eight heaters of the type shown in FIGURE 1 for heating the occupants of a limited floor area in a large building, the size and placement of the heaters being selected by the method of the present invention;

FIGURE 9 is a similar chart for a row of heaters of the type shown in FIGURE 1.

Figure 4:
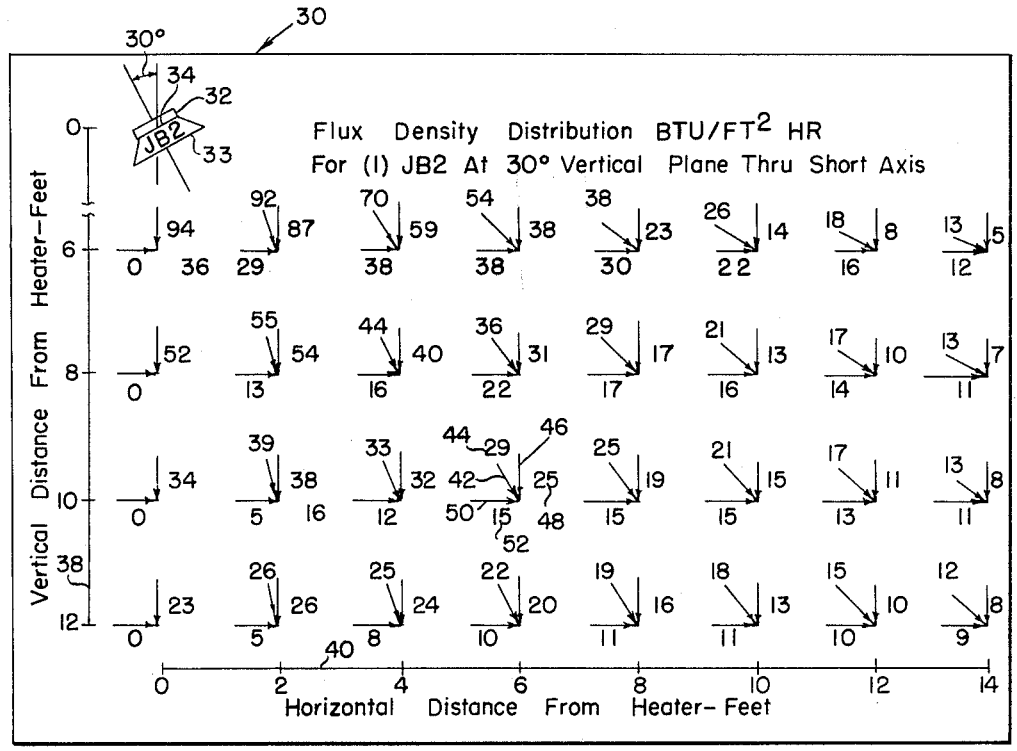
FIGURE 4 is a chart of radiation flux densities at different horizontal and vertical distances from a specific model of heater of the type shown in FIGURE 1 when the radiant face of the heater is inclined at an angle of 30 degrees from the horizontal.

While the embodiment of the invention illustrated and described herein shows its application to a specific type of infrared heater, this is for purposes of illustration only as the method may be employed for determining suitable sizes and arrangements of any radiant heaters for which the necessary charts have been prepared in accordance with my invention.

As shown in FIGURE 1, one type of heater 12 with which the method and apparatus of the present invention have been successfully employed, known on the market as the Perfection-Schwank heater, includes a flat radiant face 14, heated to incandescence by the combustion of gas passing outward through perforations in and burning on the outer surface of face 14. A reflector 16 surrounding face 14 reduces scattering of the radiant energy emitted from face 14 to areas where heat is not needed. While infrared rays are emitted from radiant face 14 to all objects located at points from which its surface can be seen, the chief concentration of the radiation is in a direction generally normal to face 14 as indicated by wavy arrows 18, although this may vary according to the design of reflector 16. Such burners are described in detail in United States Patent No. 2,775,294 issued to G. Schwank, December 25, 1956, for Radiation Burners and in copending application No. 243,916 filed December 11, 1962, by M. W. Patrick et al. for Infrared Burner and Methods of Infrared Production, to which reference may be had if deemed necessary.

Where the area to be heated is small, as for example a space to be occupied by one or two people, the arrangement shown in FIGURE 2 is frequently used. Here two heaters 12a and 12b are placed on opposite sides of the occupants, represented by the figure in seated posture shown at 20a. The optimum size, location, and orientation of heaters 12a and 12b can be quickly and easily determined by the method described hereinafter.

Where the area to be heated is larger, in accordance with my invention the heaters may be arranged in rows outside of the area as shown in FIGURE 3. Here eight heaters 12 are oriented to direct heat on individuals (such as the man shown at 20b) within an area indicated by the broken lines 22 on floor 24 of building 26. The heaters may be suspended from ceiling 28 or from the walls, posts or other parts of the structure but are generally arranged in rows located on opposite sides of the space to be heated as shown in FIGURE 3.

This invention is directed toward placement of heaters of the type described above at points and in arrangements where the greatest advantage can be taken of their radiation for warming persons in specific areas, and to the selection of heaters which will provide adequate heat for a given purpose without excess capacity, permitting further selection to be made on the basis of initial cost, operating cost, appearance, convenience for servicing, or suitability for the environment.

Where an entire building or enclosure is to be heated, known methods may be employed to ascertain the heat losses therein, and to calculate the heat necessary to compensate for the losses. However, where heat is required only in spots or limited areas in large buildings, open spaces, or out-of-doors, there has heretofore been no satisfactory method of determining the proper heater capacity to be installed and the proper arrangement of the equipment. For example, a choice must be made among the models of heaters available; whether to install a large number of small heaters or a smaller number or larger heaters must be decided; and whether the heaters should be placed (a) directly overhead, (b) around the perimeter of the area where heat is wanted, (c) overhead and outside of the area with their radiant faces directed toward the space to be heated, or (d) mounted vertically just above the floor outside of the space must be determined. If an overhead installation is to be employed, the best height must also be determined.

By the method and with the apparatus provided by this invention, those combinations which will supply heat to the occupants at the optimum rate can be quickly determined. The method of determining arrangements which will provide the required heat is as follows: First, the amount of heat per square foot per hour needed to compensate for the heat which would be lost from the bodies of persons if they were within the space without the radiant heaters operating is determined from known tables of body heat losses or in any other desired manner. Particularly useful tables of this type are incorporated in the Area and Spot Heating Comfort Calculation Kit published by the Perfection Division of Hupp Corporation to which reference may be had if desired. Second, the flux density per square foot per hour of the radiation from each specific heater (or group of heaters) striking the body of an occupant in his usual posture within the space is determined for any given relation position of heater and occupant by the method set forth hereinafter. Third, those arrangements or combinations which provide an amount of heat adequate to compensate for heat which would otherwise be lost by the occupant can be checked to compare prices, operating costs and other factors.

To determine the flux density discussed above, charts such as the chart 30 shown in FIGURE 4 are employed. Chart 30 includes the outline of a heater 32, the specifications of which would normally be provided in the manufacturer's catalog. This heater has a radiant face (not shown) which for practical purposes is coincident with the lower edge 33 of heater 32 in a plane perpendicular to line 34 which is inclined at an angle of 30 degrees with the horizontal.

At various points 36 on chart 30 located at vertical distances corresponding to elevations 6, 8, 10 and 12 feet below the radiant surface and at horizontal distances corresponding to 0, 2, 4, 6, 8, 10, 12, and 14 feet horizontally spaced from the radiant surface (in the direction of the inclination of the radiant face above horizontal) there are arrows 42 accompanied by numerals 44. These numerals give the value of the flux density at each point 36 (expressed in B.t.u. per square foot per hour) on a surface normal to the direction of the incident radiation which is indicated by the associated arrow 42. At each point 36 there is also a vertical arrow 46 with a numeral 48 giving the value of the flux density on a horizontal surface at that point and a horizontal arrow 50 with a numeral 52 giving the value of the flux density on a vertical surface at the same point. All of the arrows 42 converge toward the center of the radiant surface of heater 32.

Vertical scale 38 is broken between the indications representing 0 and 6 feet in order to reduce the height of the chart, so that heater 32 and line 34 are shown below their correct positions with respect to points 36. Since heaters are normally located closer than 6 feet to the floor, this creates no difficulties in using the chart.

If desired, the chart may be extended to encompass greater horizontal and/or vertical distances from the radiant surface of the heater.

Similar charts are provided by the manufacturer for each of his models and for groups of heaters in specific arrangements. There would also be charts for heaters oriented with the radiant surface vertical, horizontal and inclined at angles other than 30°.

Figure 5:
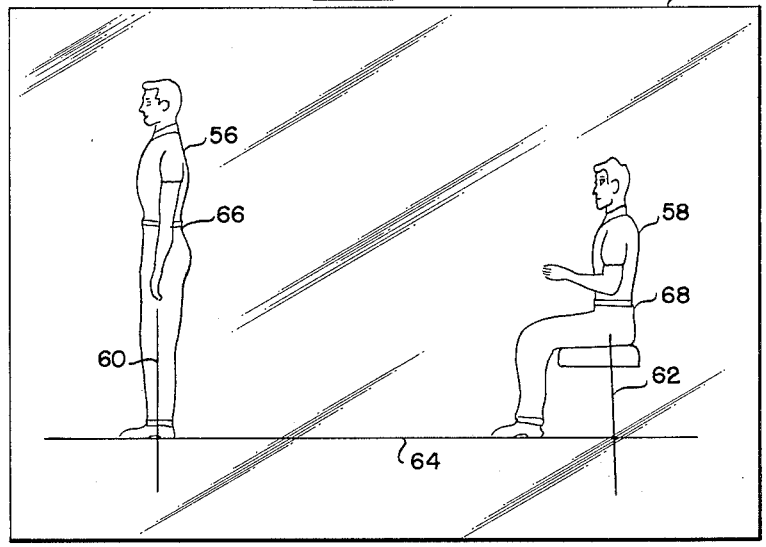
FIGURE 5 illustrates a transparency for use in conjunction with charts such as that shown in FIGURE 4.

Employed with chart 30 in ascertaining the flux density at various locations removed from heater 32 is a transparency 54. As shown in FIGURE 5 transparency 54 is a thin sheet of transparent plastic or other suitable material upon which the outline 56 of a man in standing position and the outline 58 of a man in sitting position are printed. These outlines are drawn to the same scale as chart 30. The vertical centerline of the figure 56 depicting the man in standing position is indicated by a vertical line 60 and the vertical centerline of the figure 58 depicting the man in sitting position is indicated by a vertical line 62. The two outlines are arranged with the feet of the figures 56 and 58 on horizontal line 64. The vertical midpoint of the erect figure 56 is indicated by the belt 66 and the vertical midpoint of the seated figure by belt 68.

The figures are scaled to represent a man 5 feet 10 inches tall. Different transparencies can be provided for other size persons. For example, if the heated area were a school room or a play yard, smaller figures representing a child would be used.

Figure 6:
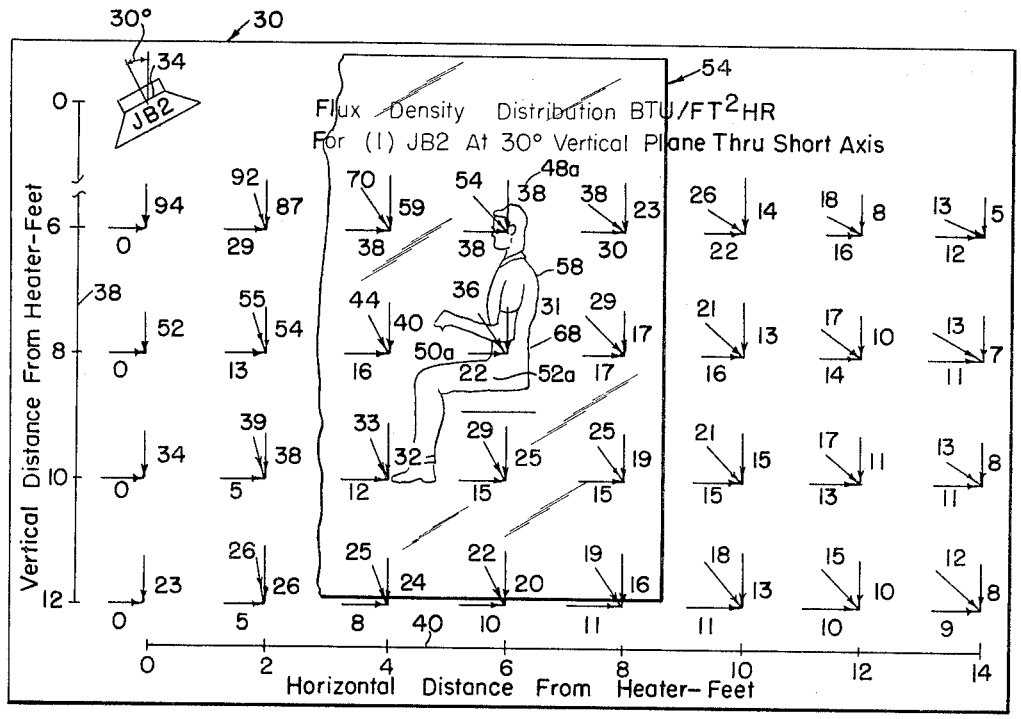
FIGURE 6 shows a portion of the transparency of FIGURE 5 placed on the chart of FIGURE 4.
Figure 7:
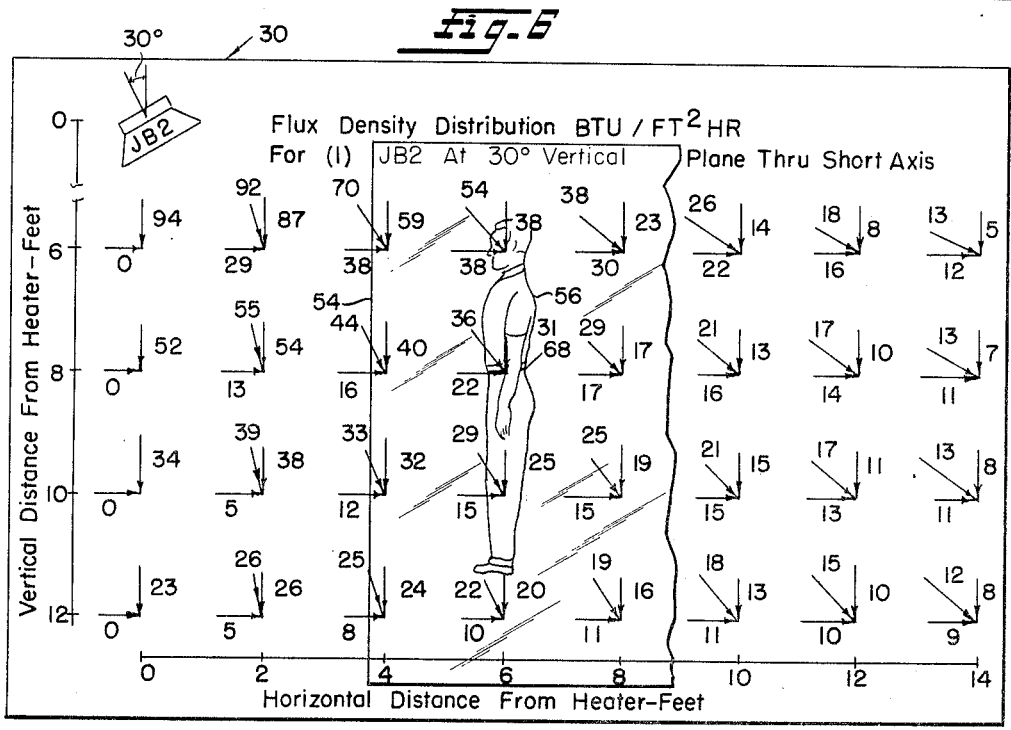
FIGURE 7 shows another portion of the transparency of FIGURE 5 placed on the chart of FIGURE 4.

FIGURE 6 shows the use of transparency 54 and chart 30 to ascertain the flux density of incident radiant energy on persons who would normally be seated when in the space in which heat is to be supplied by radiant heater 32. As shown in this figure, transparency 54 is placed on chart 30 in a position where the horizontal and vertical distances (as indicated on scales 40 and 38 of chart 30 respectively) from the center of the radiant face of heater 32 (represented by line 34) to the center of the belt 68 of the seated figure are consistent with the proposed location of heater 32 relative to a person seated at the center of the heated space.

The horizontal arrow 50a at belt 68 has a numeral 52a associated with it reading "22," which means that, if the heater were located 10 feet above the floor (as indicated by the reading of line 64 on vertical scale 38) and 6 feet horizontally from the subject (as indicated by the position of vertical centerline 62 on horizontal scale 40), the flux density in a horizontal direction on vertical surfaces of the body at belt line 68 would be 22 B.t.u. per square foot per hour on the side of the body facing the heater. The intensity at the belt is, practically speaking, the average intensity on the body's vertical surfaces.

If calculations show that 40 B.t.u.'s per square foot per hour is needed under existing conditions to provide thermal comfort, it would be necessary to use at least two heaters which would supply 44 B.t.u. per square foot per hour to the subject, or to use a heater having twice the output of heater 32.

Unless a particular relation between subject and heater is critical, transparency 54 may be shifted on chart 30 to determine if the flux density at other relative positions of heater and subject provide a more favorable condition.

With the transparency in the position shown in FIGURE 6, the flux density on the top of the head of the figure 58 is indicated by numeral 48a and is 38 B.t.u. per square foot per hour from a single heater. If two heaters of the capacity of heater 32 were employed on each side of the subject, to ensure that adequate radiation reached the lower portions of his body, for example, the total intensity on the head of the subject would be 152 B.t.u. per square foot per hour. If this intensity were too great for comfort, the chart and transparency could be employed to determine whether raising the heaters to a greater height or tilting them at a greater angle, would reduce the difference in flux distribution between the subject's head and the lower portion of his body.

Where the occupants of an area usually stand, upright outline 56 of transparency 54 is employed to determine the flux distribution on the subject. The horizontal component of the flux density at the midpoint or belt 68 of the outlined figure is used to determine the heat supply rate when the heater is located at a height above the floor corresponding to line 64 of FIGURE 56 relative to vertical scale 38 and at a horizontal distance from the subject indicated by the location of vertical centerline 60 relative to horizontal scale 40.

Where radiant heaters are to be used to heat subjects who are usually in a reclining position, upright outline 56 is placed on the chart with line 60 horizontal by rotating the transparency 90 degrees; and the vertical component of the flux density is used to determine the rate of supply of radiant heat to the body.

Where different heaters are used on opposite sides of the subject, heat impinging on the back of the body can be determined by reversing the transparency; that is, by turning it over and placing it on the chart for the heater which is to be behind the subject.

Figure 8:
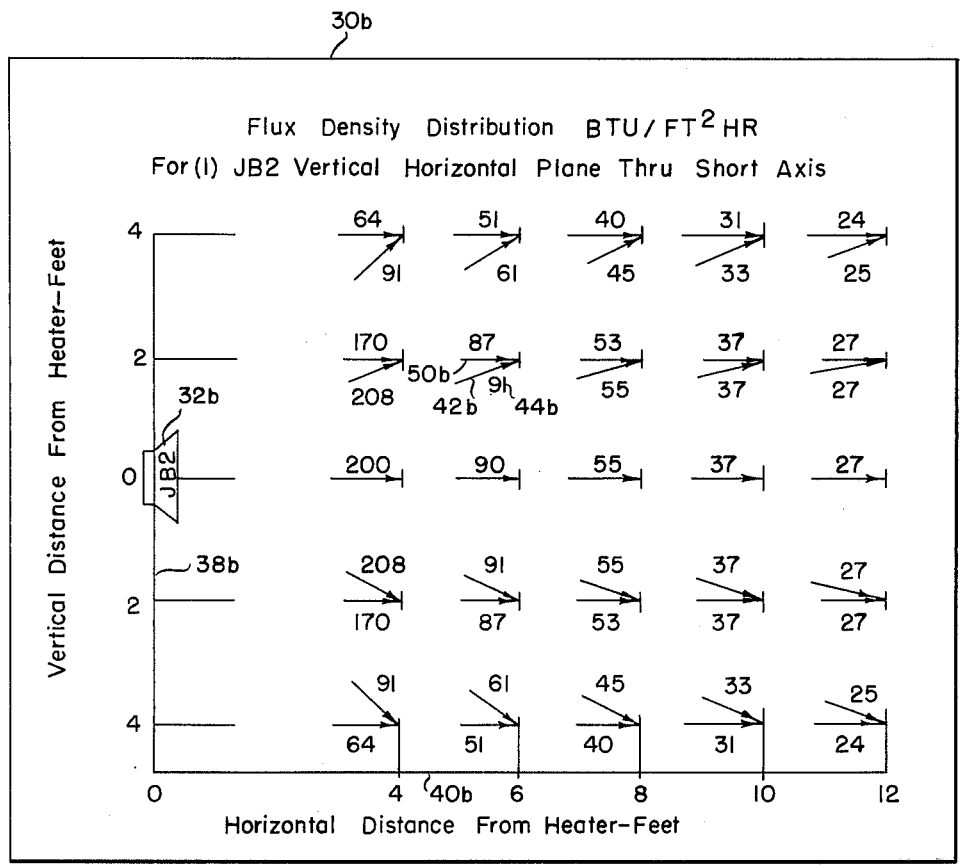
FIGURE 8 shows a chart of the same type as that shown in FIGURE 4 for a heater having its radiant face vertical.

In many instances, the greatest comfort and heating efficiency can be secured by mounting the heaters at the sides of the space to be heated, and at body height with the radiant surfaces of the heaters vertical, so that the radiant energy emitted from the heaters will be generally normal to the body surface of the standing or seated subject. FIGURE 8 shows a chart 30b for a heater installed in such an orientation. Chart 30b includes a heater 32b, a vertical scale 38b and a horizontal scale 40b. The vertical components of the radiation are not shown on this chart as they are quite small. In contrast, the horizontal components of the emitted radiation, shown by arrows 50b and numerals 52b at various points 36b, are almost as great at most points as the flux densities in a direction toward the center of the heater face (shown by arrows 42b and numerals 44b). Thus the flux density normal to the body surface is greater than where the heaters are elevated, as may be seen by comparing charts 30 and 30b. However, in many instances, the type of installation shown in FIGURE 8 cannot be used because of intervening objects between the heater and the occupants of the space or because there are objections to having the heaters near floor level. In these instances the heaters must be located at a higher elevation as shown in FIGURE 4.

Where the heaters are arranged as shown in FIGURE 2 with one heater 12a in front and another 12b behind the subject, the subject will be inadequately heated if each heater provides only enough flux density to balance the losses from the portions of the body facing the heater, since little heat will be received by the sides of the body not facing one of the two heaters and the over-all effect will be one of underheating the subject. Therefore, in installations of this type, the square foot heat loss to be balanced by the radiation is increased by 20% to ensure that adequate heat reaches the subject.

Where there are heaters on four sides of the subject, or where there are rows of heaters on two sides, with at least four heaters in each row as in the installation depicted in FIGURE 3, the sides of the subjects receive sufficient heat from the more remote heaters that the subject is adequately heated without adding the 20% factor to the calculated heat loss.

In actual use, there may be several persons in the area to be heated, they will not be located at the same spot, and may not be facing one of the heaters as depicted as is assumed in the use of chart and transparency. However, the actual heating effect on the occupants of the space is predicted quite accurately by the novel method outlined above even though the occupants do not remain in the precise location or orientation relative to the heater or heaters which was selected in employing the charts and transparency.

Normally, it will be found that several different heater models can provide the required flux density if they are properly located and oriented, as determined by moving the outlined figures 56 and 58 around the different charts. This permits selection of the most suitable model with respect to other considerations, providing greater design flexibility for the heating engineer.

In addition to the charts provided for individual heaters, charts can also be prepared showing flux densities from groups of heaters at various spacings, such as, for example, the arrangement shown in FIGURE 3. A chart 30c of this type is shown in FIGURE 9. In each case the manufacturer prepares charts covering his various models in recommended positions, orientations and combinations; the installer or heating engineer calculates the required flux density on the occupants of the area to be heated; selects the heater or heaters required to provide this amount of flux density per square foot of body area; and then determines the most effective placement of the heater or heaters by moving the transparency over the charts to determine the flux density distribution for various orientations of the heating equipment relative to the occupants.

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A radiant energy distribution indicating device, comprising:
    (a) means providing a large area surface;
    (b) means depicting radiant heating means on said surface;
    (c) means on said surface at points removed from the depiction of said radiant heating means indicating for each said point the flux density of the radiant energy emitted from said radiant heating means on at least one plane normal to said surface and including said point, said plane having a predetermined orientation relative to said radiant heating means;
    (d) means providing rectangular coordinates on said surface and scales thereon identifying the distances in two mutually perpendicular directions between said radiant heating means and each of said points; and
    (e) a substantially transparent member having thereon at least one outline of a person in a predetermined position, said outline being to the same scale as said rectangular coordinates, whereby said transparency may be placed on said surface to produce a representation of the flux density on a person of the radiant energy emitted from the depicted radiant heating means.

2. The device as defined in claim 1, wherein there are three of said planes through each of said points, one of said planes being parallel to each of said rectangular coordinates and the third of said planes extending through the point and the midpoint of the radiant surface of said radiant heating means in the plane of said surface.

3. The device as defined in claim 1, wherein a line representing the radiant surface of said radiant heating means intersects both of said rectangular coordinates.

4. The device as defined in claim 1, wherein the depicted radiant heating means is a row of aligned equally spaced apart radiant heaters.

5. A radiant energy distribution indicating device comprising:
    (a) means providing a large area surface;
    (b) means depicting radiant heating means on said surface;
    (c) means on said surface at points removed from the depiction of said radiant heating means indicating for each said point the flux density of the radiant energy emitted from said radiant heating means on at least one plane normal to said surface and including said point, said plane having a predetermined orientation relative to said radiant heating means;
    (d) means providing rectangular coordinates on said surface and scales thereon identifying the distances in two mutually perpendicular directions between said radiant heating means and each of said points; and
    (e) overlay means comprising a figure representing a body to be heated, said figure being to substantially the same scale as the rectangular coordinates, whereby said overlay means may be placed on said surface to produce a representation of the flux density on said body of the radiant energy emitted from the depicted radiant heating means.

6. The device as defined in claim 5, wherein said points are spaced sufficiently close together that said outline encompasses a plurality of said points, whereby a representation of said flux density on different portions of a body is produced.

7. The device as defined in claim 5, including means on said overlay means for orienting said outlined figure relative to said rectangular coordinates.

8. A radiant energy distribution indicating device, comprising:
    (a) a first member providing a large area surface;
    (b) means depicting radiant heating means on said surface;
    (c) means on said surface at points removed from the depiction of said radiant heating means indicating for each said point the flux density of the radiant energy emitted from said radiant heating means on at least one plane normal to said surface and including said point, said plane having a predetermined orientation relative to said radiant heating means;
    (d) means providing rectangular coordinates on said surface and scales thereon identifying the distances in two mutually perpendicular directions between said radiant heating means and each of said points; and
    (e) a second member comprising a figure representing at least in outline a body to be heated, said figure being to substantially the same scale as the rectangular coordinates, at least one of said first and second members being substantially transparent, whereby the transparency may be placed over the other of said members to produce a visual representation of the flux on said body of the radiant energy emitted from the depicted radiant heating means.

9. The device as defined in claim 8, wherein there are on said second member outlines of persons in a plurality of positions.

10. Apparatus for selecting radiant heaters and combinations and orientations of radiant heaters capable of providing radiant energy of at least a predetermined flux density at a location remote therefrom, comprising:
    (a) a first substantially transparent member having a human figure outlined thereon; and
    (b) a second member having at each of a plurality of spaced points thereon direction indicating indices and a numeral associated with each of said indices representing the flux density incident upon a plane through said point and normal to the associated index of radiant energy emitted by a particular radiant heating means with its radiant surface in a predetermined orientation relative to said point and at a predetermined distance therefrom;
    (c) said first and second members being relatively movable and said figure and the distances between the points on said second member being to the same scale to permit location of said figure at different ones of the points on said second member, whereby the flux density incident on said figure at each of said points may be determined by inspection.

11. Apparatus as defined in claim 10, including a plurality of members similar to said second member, one for each radiant heater and for each orientation and each combination of radiant heaters.

References Cited by the Examiner

UNITED STATES PATENTS

| 2,494,536 | 1/50 | Atwood | 235—89 |
| 2,512,387 | 6/50 | Sands | 235—89 |
| 2,656,099 | 10/53 | Selling | 235—61 |

LEO SMILOW, *Primary Examiner.*

LEYLAND M. MARTIN, *Examiner.*